(12) United States Patent
Cherry et al.

(10) Patent No.: US 10,377,678 B2
(45) Date of Patent: Aug. 13, 2019

(54) SULPHUR-BASED FERTILIZER COMPOSITION WITH HUMIC ACID CONTENT

(71) Applicant: Tiger-Sul (Canada) Co., Halifax (CA)

(72) Inventors: Don T. Cherry, Westport, CT (US); Guy Wesley Haun, West Liberty, OH (US); Steven Azzarello, Mundelein, IL (US); Richard Valagene, Republic, MO (US)

(73) Assignee: TIGER-SUL (CANADA) CO. (CA)

( * ) Notice: Subject to any disclaimer, the term of this patent is extended or adjusted under 35 U.S.C. 154(b) by 0 days.

(21) Appl. No.: 15/671,497

(22) Filed: Aug. 8, 2017

(65) Prior Publication Data

US 2017/0334795 A1    Nov. 23, 2017

Related U.S. Application Data

(63) Continuation of application No. 14/736,840, filed on Jun. 11, 2015, now abandoned.
(Continued)

(51) Int. Cl.
*C05D 9/00* (2006.01)
*C05D 9/02* (2006.01)
(Continued)

(52) U.S. Cl.
CPC .............. *C05D 9/00* (2013.01); *C05D 9/02* (2013.01); *C05F 11/02* (2013.01); *C05G 3/0094* (2013.01)

(58) Field of Classification Search
None
See application file for complete search history.

(56) References Cited

U.S. PATENT DOCUMENTS 4,804,403 A * 2/1989 Moore ............... C05C 9/00
                                                      71/28
5,393,317 A   2/1995 Robinson
(Continued)

FOREIGN PATENT DOCUMENTS

AU    2009200226    8/2009
CN      1923765    3/2007
(Continued)

OTHER PUBLICATIONS

International Plant Nutrition Institute (IPNI), Plant Food Uptake and Removal for Northcentral Region Crops, retrieved from ipni.info/nutrientremoval 2019.
(Continued)

*Primary Examiner* — Wayne A Langel
(74) *Attorney, Agent, or Firm* — Bryan Cave Leighton Paisner LLP (57) ABSTRACT

Disclosed herein are fertilizer compositions with enhanced sulphate release, methods of making the fertilizer compositions and methods of using the fertilizer compositions. The disclosed fertilizer compositions combine elemental sulphur with small amounts (relative to the sulphur) of humic acid to enhance delivery of sulphates to soil. The humic acid is added as a humic additive, which may comprise 40% or more humic acid. In many embodiments, the presence of small amounts of humic additive enhances the release of sulphate from soil containing the fertilizer composition from about 1.5- to 4-fold over fertilizer compositions lacking the humic additive.

22 Claims, 5 Drawing Sheets

Related U.S. Application Data (60) Provisional application No. 62/113,139, filed on Feb. 6, 2015.

(51) Int. Cl.
   *C05F 11/02* (2006.01)
   *C05F 11/00* (2006.01)
   *C05G 3/00* (2006.01)

(56) References Cited

U.S. PATENT DOCUMENTS

| | | | |
|---|---|---|---|
| 5,451,240 | A | 9/1995 | Trowbridge |
| 6,783,567 | B1* | 8/2004 | Waters ............... C05D 9/00 71/24 |
| 8,636,822 | B1 | 1/2014 | Boyce et al. |
| 8,702,834 | B2 | 4/2014 | Antens |
| 8,801,827 | B2 | 8/2014 | Taylor et al. |
| 10,167,240 | B1 | 1/2019 | Merritt et al. |
| 2002/0174697 | A1* | 11/2002 | Reid ................. C05B 17/00 71/23 |
| 2004/0035162 | A1* | 2/2004 | Williams ........... C05B 17/00 71/28 |
| 2006/0130546 | A1 | 6/2006 | Beaton |
| 2007/0193321 | A1* | 8/2007 | Phillips ............... C05C 1/00 71/28 |
| 2012/0090367 | A1 | 4/2012 | Wright |
| 2012/0279266 | A1 | 11/2012 | Van Dyke et al. |
| 2013/0184151 | A1 | 7/2013 | Hanson et al. |
| 2013/0227998 | A1 | 9/2013 | Copplestone |
| 2014/0144195 | A1* | 5/2014 | Callendrello ....... C05F 17/0018 71/10 |
| 2014/0216120 | A1 | 8/2014 | Taylor et al. |
| 2015/0321967 | A1* | 11/2015 | Oliferenko ............ C09K 17/14 71/23 |

FOREIGN PATENT DOCUMENTS

| | | | |
|---|---|---|---|
| CN | 101066901 | * | 11/2007 |
| CN | 101402532 | | 4/2009 |
| ES | 2111466 | | 3/1998 |
| JP | 06116558 | | 4/1994 |
| WO | 2015017329 | | 2/2015 |

OTHER PUBLICATIONS

Chen et al., Humic Substances in Soil and Crop Sciences: Selected Readings, ed. Patrick MacCarthy, Effects of Humic Substances on Plant Growth, American Society of Agronomy, Inc., Soil Science Society of America, Inc., 1990, chapter 7, 161-186.

Hartz et al., Humic Substances Generally Ineffective in Improving Vegetable Crop Nutrient Uptake or Productivity, HortScience, 2010, 13 pgs.

* cited by examiner

SULPHUR-BASED FERTILIZER COMPOSITION WITH HUMIC ACID CONTENT

CROSS-REFERENCE TO RELATED APPLICATIONS

This application claims benefit of priority pursuant to 35 U.S.C. § 119(e) to U.S. Provisional Patent Application No. 62/113,139, filed on Feb. 6, 2015, entitled "Sulphur-Based Fertilizer Composition with Humic Acid Content," the content of which is hereby incorporated by reference herein in its entirety.

FIELD

The present disclosure is directed to fertilizer compositions with enhanced sulphate release, methods of making fertilizer compositions and methods of using fertilizer compositions.

BACKGROUND

Sulphur is an essential plant nutrient included in fertilizer compositions to improve crop performance. In order to be useable by plants, it is desirable that the sulphur be in the sulphate form.

Natural fertilizer products, or products that are certifiable as organic, are desirable. Elemental sulphur is one type of sulphur additive used in organic farming. Before elemental sulphur can be used by a plant, however, it must first be oxidized to sulphate form. The sulphates may then be taken up by the plants.

Alkaline (or basic) soils may slow sulphur oxidation, as may some other types of soil conditions (for example soil containing carbonates, which may be found in arid zones). In some cases, soil acidification may be needed to correct the soil pH where the pH is high. Soil acidification may aid in converting elemental sulphur to sulphate form. Microbial action may also aid in converting elemental sulphur to sulphate.

SUMMARY

In one aspect, the present disclosure relates to organic fertilizer compositions that comprise elemental sulphur, swelling clay, and humic acid. In one aspect the disclosed fertilizer composition comprises at least 85% by weight of sulphur, 0.5% by weight of humic additive, and the remainder bentonite clay. Many embodiments comprise at least 50% by weight of sulphur; and 0.01% to 5% by weight of humic additive, and may further comprise a swelling material, such as swelling clay or bentonite clay; the sulphur of the fertilizer composition may be elemental sulphur, for example at a percentage of at least 75% by weight or 85% by weight; the humic additive can be present in an amount of 0.1% to 1.0% by weight, for example about 0.5% by weight, and the humic additive may comprise greater than 40% or 50% humic acid. In many embodiments, the fertilizer composition is a controlled release fertilizer composition, comprising from 5% to 25% by weight, or 5% to 15% by weight, of the swelling material. The fertilizer composition may further comprise one or more additional nutrients selected from the group consisting of nitrogen, potassium, iron, copper, zinc, boron, manganese, and magnesium, wherein the one or more additional nutrients is present in the fertilizer composition in an amount of from about 0.01% to about 40% by weight. The disclosed fertilizer composition can be provided as one or more of a pellet, pastille, or granule.

Also disclosed are methods of fertilizing a plant, comprising applying the disclosed fertilizer composition to a soil, wherein the soil includes a plant or plant seed, or wherein a plant or plant seed is added to the soil after the fertilizer is dispersed in the soil. Methods of conditioning a soil are also disclosed, the methods comprising applying the disclosed fertilizer composition to the soil. Also disclosed are methods of manufacturing a fertilizer composition containing sulphur and humic acid, the method comprising mixing molten elemental sulphur and humic additive, wherein the humic additive comprises from 0.1% to 5% by weight of the mixture, and cooling the mixture to obtain the fertilizer composition, wherein the method may further comprise forming the fertilizer composition into pastilles, pellets, or granules and then cooling the composition below the melting point of sulphur in the cooling step, and the humic additive may have an average particle size of less than 200 Mesh.

DETAILED DESCRIPTION

Elemental sulphur is an excellent source of sulphur in fertilizers. However, before the sulphur can be used by a plant, the elemental sulphur must be converted to sulphate. In many cases this is aided by the action of microorganisms present in the soil. Disclosed herein are surprising results demonstrating a process of delivering elemental sulphur to soil in a form that enhances delivery of sulphates to the soil. Surprisingly, the presence of humic acid enhances conversion to, and release of, plant-useable sulphates from the disclosed fertilizer. The humic acid may aid microorganisms, present in the soil, in converting the elemental sulphur into the plant-useable sulphate form. As such, a fertilizer composition combining elemental sulphur with small amounts of humic acid can provide synergistic effects with respect to the availability of plant-useable sulphate.

One advantage of including humic acid with elemental sulphur in a fertilizer composition is that the organic acids of the humic acid can, in some cases, enhance microbial breakdown of sulphur into plant-available sulphate form. This increases the rate at which the elemental sulphur is available to the plant. Furthermore, incorporating humic acid into an elemental sulphur-containing fertilizer can facilitate soil management/conditioning because the amount of plant-available sulphur in the soil can be more easily regulated without the need for other compounds to be added to the soil.

The fertilizer composition described herein may include an amount of elemental sulphur (about 70% by weight or more) in combination with lower amounts of humic compounds (15% by weight or less). In one embodiment, the amount of elemental sulphur may be about 80.5% by weight and the amount of humic additive may be about 0.5%, with the remainder comprising other additives selected from colorants, binders, and swelling materials.

Sulphur Component

The sulphur component of the disclosed fertilizer composition can be comprised substantially of elemental sulphur. As discussed in connection with the production of fertilizer pastilles below, elemental sulphur can be provided in molten, crystalline, or powdered form and mixed with other components of the disclosed fertilizer compound. The sulphur component can be greater than about 90%, 95%, 97%, 98%, or 99% by weight elemental sulphur. In many embodiments, the sulphur component is a certified organic material.

The sulphur component can constitute the bulk of the fertilizer composition (i.e., at least about 50% by weight) and can form the matrix of the fertilizer in which the other components are distributed. In some aspects, the sulphur component can be present in the fertilizer composition in an amount of from about 40% to about 95% by weight, from about 60% to about 90% by weight, or from about 80% to about 90% by weight, for example about 85% by weight. In many embodiments, the weight of the sulphur component as a percentage of the total weight of the fertilizer composition is greater than about 40%, 45%, 50%, 55%, 60%, 65%, 70%, 75%, 80%, 85%, 90%, or 95%, and less than about 99%, 95%, 90%, 85%, 80%, 75%, 70%, 65%, 60%, 55%, 50%, or 45%. In one embodiment, the sulphur component may be about 90% or about 85% of the fertilizer mix.

As used herein, the term "about" will be understood to broaden the ranges somewhat to include values that may be attributable to known errors in measurement, compounding the fertilizer composition, or expected variations in raw material compositions. In most cases, the term "about" modifies the value by ±10%.

Humic Additive

The humic additive of the disclosed fertilizer composition can be obtained from various sources such as soil, sediments, humus, peat, or other source of degraded organic matter. Humic acid may refer to a complex mixture of organic acids, comprising humic and fulvic acids.

The humic additive in the disclosed fertilizer composition can be provided in various forms from granules to fines. In many embodiments, the humic additive may be in granule or powdered form. For example, the humic additive may be a fine powder of less than about 40 Mesh (420 micron). In many embodiments, the humic acid powder may comprise greater than about 50%, 55%, 60%, or 65% by weight of particles with a mesh size less than about 200 Mesh (74 micron). Exemplary sources of humic additive can be found in Humics and/or Leonardites from Western Canada and the American West.

The humic additive may comprise various percentages of humic and/or fulvic acid. In many cases the humic and/or fulvic acid in the humic additive may be between about 20% and 100% by weight of the humic additive, for example between about 40% and 65%, or 45% and 60%, or 50 and 55%. In many embodiments the percentage of humic/fulvic acid is greater than about 30%, 35%, 40%, 45%, 50%, 55%, 60%, 65%, 70%, 75%, 80%, 85%, 90%, or 95%, and less than about 100%, 95%, 90%, 85%, 80%, 75%, 70%, 65%, 60%, 55%, 50%, 45%, 40%, 35%, or 30%. In some embodiments, the humic additive may comprise humic acid and various additional compounds, for example ash. As used herein, humic acid may be used to refer to organic acids derived from humic additives, for example humic acids and fulvic acids.

The humic additive may be added to the disclosed fertilizer composition in an amount from about 0.01% to about 15% by weight of the total weight of the fertilizer composition. In some embodiments the humic additive can be included in the fertilizer composition in an amount from about 0.05% to about 10%, from about 0.1% to about 5.0%, and from about 0.2% to about 2.0% by weight. In many embodiments, the humic additive is included in the fertilizer composition in a weight percent that is less than about 15%, 12.5%, 10%, 5.0%, 2.5%, 2.0%, 1.5%, 1.4%, 1.3%, 1.2%, 1.1%, 0.9%, 0.8% 0.7% 0.6% 0.5% 0.4%, 0.3%, 0.2%, or 0.1, and greater than about 0.05%, 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, 2.0%, 2.5%, 5.0%, 10.0%, or 12.5%. In one embodiment, the percent humic additive is about 0.5% by weight of the total weight of the fertilizer composition.

The humic additive may be generally acidic, with a pH less than about 7. In many embodiments, the pH of the humic additive may be less than about 6.5, 6.0, 5.5, 5.0, 4.5, 4.0, 3.5, or 3.0 and greater than about 2.5, 3.0, 3.5, 4.0, 4.5, 5.0, 5.5, 6.0, or 6.5. In some embodiments, the pH of the humic additive is between about 3 and 5, or 3.5 and 4.0.

Swelling Material

The disclosed fertilizer composition may further comprise a swelling agent that may swell and expand when wetted. Thus, when the fertilizer composition is in pastille, pellet, or similar form, expansion of the swelling material may break the pastille, pellet, or similar form and allow additional moisture as well as microbes into the pastille. This expansion and ingress of moisture and microbes may aid in further breaking the pastille into smaller particles, which may aid in further enhancing breakdown and allowing microorganisms enhanced access to the elemental sulphur so that they can convert it into a plant-useable sulphate form. The sulphate form is released into the soil where it can be used by plants.

The swelling material may be a swelling clay, such as high-swelling bentonite clay. One suitable bentonite clay product is CANAPRILL PLUS available from Canadian Clay Products (Wilcox, Saskatchewan) that has a 200 mesh particle size (85-95%). Another suitable bentonite swelling clay is available from Muldoon Minerals, Inc. (Muldoon, Tex.). In many embodiments, the swelling material is certified or certifiable as an organic material.

The binding material can be present in the fertilizer composition in amounts of about 2% to about 30% by weight. In many embodiments, the binding material may be present in the fertilizer composition from about 5% to about 25% by weight, from about 5% to about 15% by weight, or from about 8% to about 12% by weight. In one embodiment, for example where the sulphur component is 85% by weight and the humic additive is 0.5% by weight, the swelling material may be about 19% by weight of the total of the fertilizer composition.

Other Components

The fertilizer composition can also optionally include other components. For example, the composition may include various colorants, binders, and/or nutrients, which may be included in the sulphur component, humic additive, and swelling material, or may be added separately. In some embodiments, the fertilizer composition may include a colorant such as carbon. In some embodiments, the colorant may comprise between about 0.1 and 1.0% by weight of the fertilizer composition, or 0.2 and 0.5% by weight of the fertilizer composition. In one embodiment, the colorant is carbon and its percentage, by weight, in the fertilizer composition is 0.3%. One exemplary carbon additive is THERMAX (N991, Cancarb, Alberta, Canada).

In some embodiments the nutrient(s) is/are selected from nitrogen, phosphorous, potassium, boron, iron, copper, zinc, manganese, magnesium and combinations of the foregoing. If boron is present, the fertilizer composition can include a boron containing compound as disclosed in application Ser. No. 13/761,788, filed Feb. 7, 2013, entitled SULPHUR-BASED FERTILIZER COMPOSITION WITH LOW ROCK PHOSPHATE CONTENT, and Ser. No. 13/657,550 filed on Oct. 22, 2012, entitled FERTILIZER COMPOSITION CONTAINING SULFUR AND BORON, which are incorporated herein by reference in their entireties, and disclose fertilizer compositions containing an phosphorous and anhydrous boron (e.g. anhydrous borax).

Colorants and plant nutrients can be present in the fertilizer composition in amounts of from about 0.01% to about 40% by weight, from about 0.05% to about 20% by weight, or from about 0.1% to about 2% by weight, based on elemental weight. In some embodiments, the optional plant nutrient is present at less than about 100,000 ppm, 50,000 ppm, 20,000 ppm, 10,000 ppm, 5,000 ppm, 1,000 ppm, 500 ppm, 100 ppm, or 50 ppm.

Mixing

The humic additive is generally uniformly incorporated in the fertilizer composition. In some embodiments, the humic additive can be dispersed substantially uniformly in the elemental sulphur matrix such that there is less than about a 10% variation of humic additive in individual samplings (e.g., wherein the target percentage of humic additive is 0.5%, separate samplings of 1 kg could vary from 5.5 g to 4.5 g). Desired uniformity can be achieved by ensuring sufficient mixing of the fertilizer components and by using humic acid having a sufficiently small average particle size. Substantial uniform distribution can provide a more predictable controlled release of plant-soluble sulphate from the fertilizer composition.

Controlled release fertilizer compositions release plant nutrients in controlled amounts over time when the composition is wetted. As the term is used herein, "controlled release" is intended to refer to the gradual release of the sulphur component from the fertilizer composition and does not necessarily refer to the humic acid component from the humic additive. The humic acid may or may not be released at controlled rates. The controlled release compositions are typically provided in granule, pellet, pastille, or particulate form. The fertilizer composition can be, in one embodiment, generally spherical, or in another embodiment, can be a generally pastille form. Shapes other than spherical and pastille are also possible, including mixtures of shapes. The spherical or pastille form of granulated fertilizer particles can help to reduce the generation of fines due to abrasive inter particle interaction which, in turn, reduces the amount of such fines being rendered airborne as dust, increasing the amount of fertilizer ultimately deposited on a specific piece of soil while simultaneously reducing waste. In some embodiments, the pastille may further include a dust suppressing additive and/or coating. Some embodiments can include fertilizer pellet, pastille, granule, of various shapes (pastille, spherical, oblong, and/or random etc.) having at least one measurable dimension of about 0.5 to about 4 mm, or about 1 to 3 mm, or about 2.5 mm.

The order of addition or mixing the components and additives of the disclosed fertilizer composition can be varied. In some embodiments, a portion of the sulphur and all of the swelling material may be combined first, and mixed, then the humic additive can be added to the mixture of swelling material and sulphur. The remainder of the sulphur may be added to the humic/sulphur/swelling material mixture. In some embodiments, the swelling material and/or the humic additive can be heated prior to their addition to the mixture.

The fertilizer composition may be manufactured using a batch method or using a continuous flow method. The exemplary methods for the manufacture of the disclosed fertilizer composition are described in connection with FIGS. 1 and 2, and discussed below. However, the methods shown in FIGS. 1 and 2, as discussed below, are not intended to limit the method of production to a particular method of manufacture.

Figure 1:
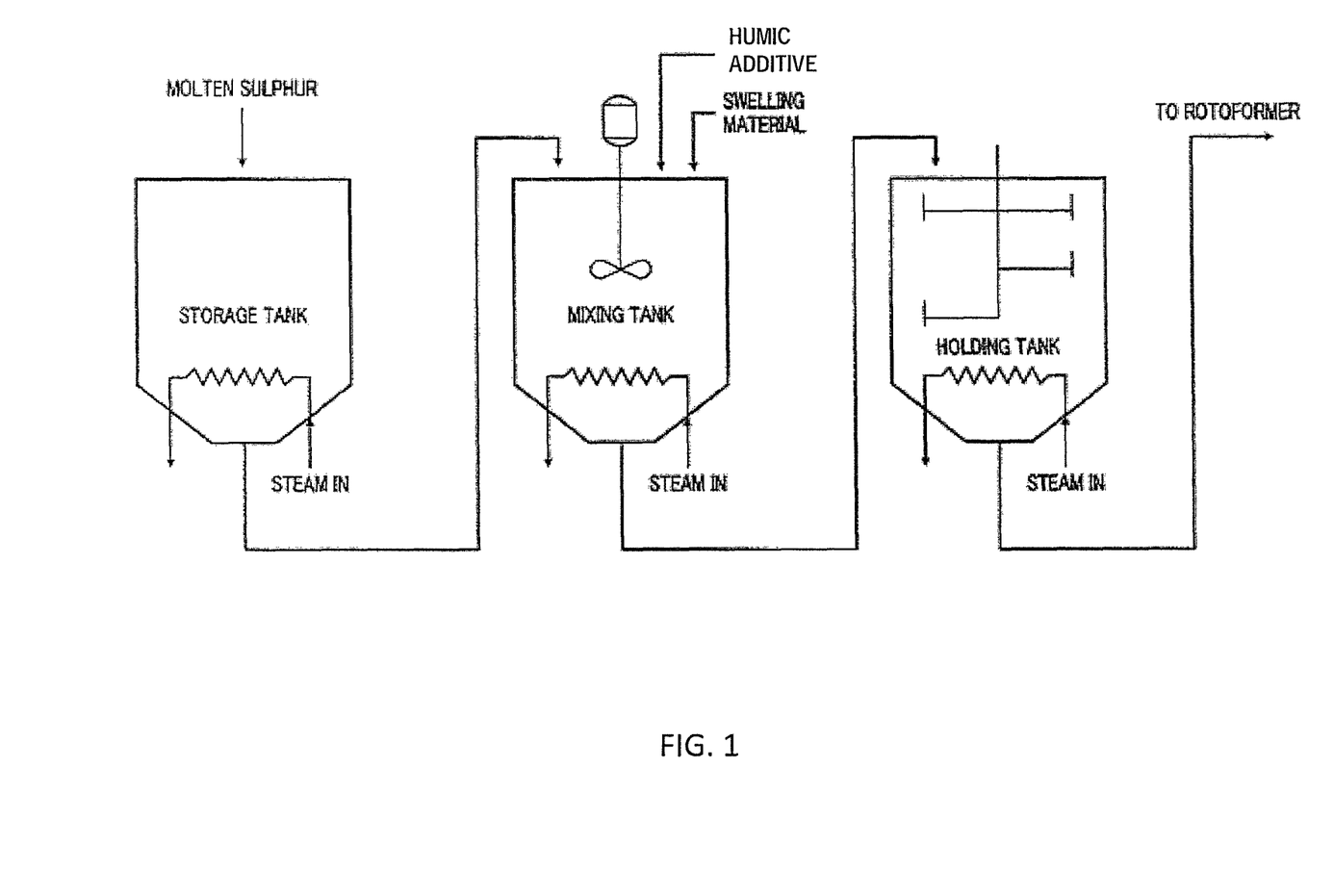
FIG. 1 is a schematic diagram illustrating an exemplary process for producing a fertilizer composition.

FIG. 1 shows an exemplary process for manufacturing a controlled release rate fertilizer containing humic additive. Here, molten sulphur having a temperature of about 250° F. is added to a storage tank. Heat is then added to the storage system through a superheated steam line. In an alternative embodiment, non-molten sulphur can be heated to a molten state and then added to the storage tank. The sulphur is then transported to a mixing tank. The molten sulphur can be pumped and metered into the mixing tank. The mixing tank then mixes the molten sulphur while the humic additive and binding material are added. In one embodiment, a swelling clay, which can be bentonite clay, is added to the continuously stirred molten sulphur. Humic additive is then added to the mixture of molten sulphur and clay. The mixture is then allowed to mix in the mixing tank for sufficient time to create a substantially homogenous mixture. In one embodiment, the mixture can be mixed for about 1 minute to about 10 hours, from about 10 minutes to about 5 hours, from about 15 minutes to about 1 hour, or for about 30 minutes. Heat is added to the system to keep the temperature well above the melting point of sulphur, e.g., at about 270° F., during the mixing process.

Figure 2:
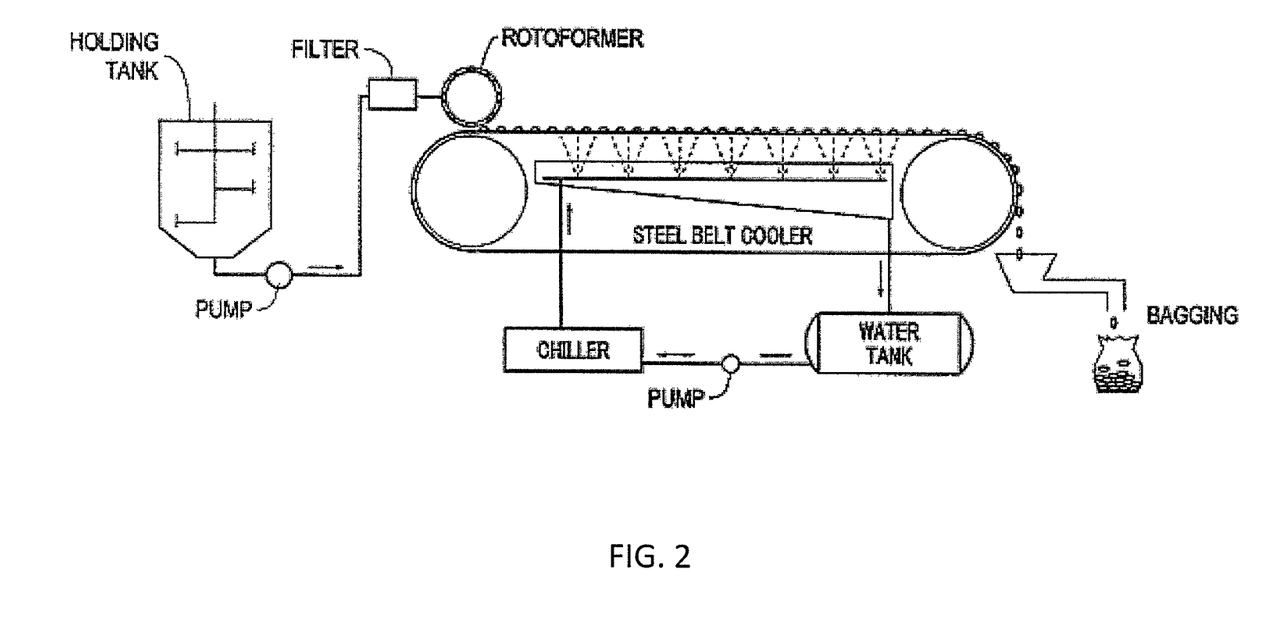
FIG. 2 is a graph comparing various soil treatments, including one embodiment of the presently claimed composition.

FIG. 2 is a schematic diagram illustrating an exemplary process for producing fertilizer pastilles with a rotoformer. The molten mixture is pumped from the holding tank through a filter, which may be a 270-mesh sized filter, for example. The filter can alternatively be a 140-mesh, 230-mesh, 325-mesh or 400-mesh filter. The molten mixture is then pumped through a rotoformer onto a steel belt. After the molten mixture passes through the rotoformer onto the steel belt, the molten mixture is then cooled on the belt to form pastilles. In one embodiment, the steel belt can be additionally cooled by spraying cooled water on the undercarriage of the steel belt. The water can be recycled and cooled or chilled prior to use in the sprayers. While FIG. 2 depicts a chiller for use with the disclosed process, other methods, such as cooling with a cooling tower, may be used to passively or actively reduce the temperature. The molten mixture can also be cooled by allowing the mixture to equilibrate with room temperature. After the pastilles sufficiently harden, they can be removed from the belt with a blade, and then either put into storage for bulk shipment or packaged in smaller bags for distribution.

In some disclosed methods, the production of sulphur dust is controlled and/or reduced. In some embodiment, a dust suppression additive may be included with the composition to help reduce sulphur dust during the handling of the pastille. The dust suppressant additive may be added to the mixture or may be added as a coating to the formed pastille. Other dust suppression techniques, well known in the art, are also possible.

While multiple embodiments are disclosed, still other embodiments of the present invention will become apparent to those skilled in the art from the detailed description and the following examples. As will be apparent, the invention is capable of modifications in various aspects, all without departing from the spirit and scope of the present invention. Accordingly, the detailed description is to be regarded as illustrative in nature and not restrictive.

All references disclosed herein, whether patent or non-patent, are hereby incorporated by reference as if each was included at its citation, in its entirety. In case of conflict between reference and specification, the present specification, including definitions, will control.

Although the present disclosure has been described with a certain degree of particularity, it is understood the disclosure has been made by way of example, and changes in detail or structure may be made without departing from the spirit of the disclosure as defined in the appended claims.

EXAMPLES

Analysis of Humic Additive-Containing Fertilizers

Laboratory research trials were conducted to evaluate the potential benefits of adding humic additives into sulphur-based controlled release fertilizers. The laboratory used for both Laboratory Trials was a member of the Canadian Association for Laboratory Accreditation and was International Organization for Standardization (ISO) 17025 certified.

Test 1

This study was conducted to evaluate the amount of sulphate that is released from sulphur-based fertilizer compositions containing a variety of additives. Results were collected over a twelve week period.

In this trial: Control is a native soil sample without any added fertilizer; T-90 is a granular degradable sulphur-based fertilizer (about 90% sulphur by weight and about 10% bentonite swelling clay by weight; TIGER 90CR®; Tiger-Sul Products); T-90·0.5R is a granular degradable sulphur-based fertilizer containing about 90% sulphur, about 0.5% rock phosphate, and the remainder bentonite clay; T-90·0.5H is a granular degradable sulphur-based fertilizer containing about 90% sulphur, about 0.5% humic additive, and the remainder bentonite clay; T-90·0.5R&H is a granular degradable sulphur-based fertilizer containing about 90% sulphur, about 0.5% rock phosphate, 0.5% humic additive, and the remainder bentonite clay; T-90·0.25R&H is a granular degradable sulphur-based fertilizer containing about 90% sulphur, about 0.25% rock phosphate, 0.25% humic additive, and the remainder bentonite clay; T-85 is a granular degradable sulphur-based fertilizer containing about 85% sulphur and the remainder bentonite clay: T-85·0.5R is a granular degradable sulphur-based fertilizer containing about 85% sulphur, 0.5% rock phosphate, and the remainder bentonite clay; T-85·0.5H is a granular degradable sulphur-based fertilizer containing about 85% sulphur, 0.5% humic additive, and the remainder bentonite clay; and T-85·0.25R&H is a granular degradable sulphur-based fertilizer containing about 85% sulphur, 0.25% rock phosphate, 0.25% humic additive, and the remainder bentonite clay.

Figure 3:
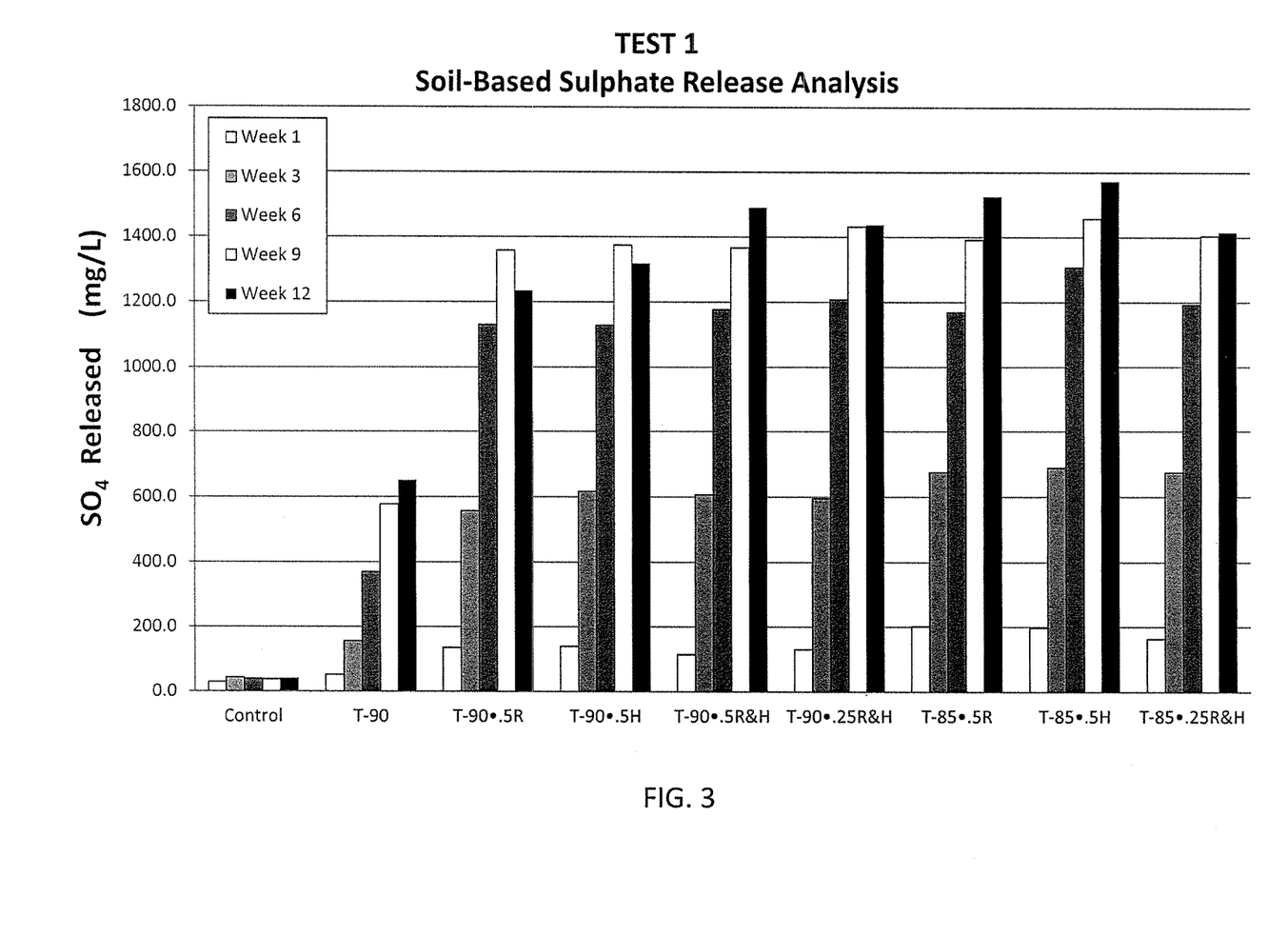
FIG. 3 is a graph of results from tests performed comparing various embodiments of the disclosed fertilizer composition.

The soil in each sample was inoculated with microorganisms that oxidize sulphur prior to the commencement of testing. 250 mg of each fertilizer composition was added to 200 g of soil at 24% saturation. Water was passed through the soil and collected at the intervals shown in Table 1. The water was analyzed for sulphate content. The results are presented in TABLE 1 and shown at FIG. 3.

TABLE 1

|  | Control | T-90 | T-90·.5R | T-90·.5H | T-90·.5R&H | T-90·.25R&H | T-85·.5R | T-85·.5H | T-85·.25R&H |
|---|---|---|---|---|---|---|---|---|---|
| Week 1 | 29.1 | 52.0 | 135 | 139.0 | 114.0 | 130.0 | 201.0 | 197.0 | 163.0 |
| Week 3 | 43.6 | 156.0 | 557 | 617.0 | 607.0 | 595.0 | 676.0 | 689.0 | 675.0 |
| Week 6 | 39.3 | 370.0 | 1130 | 1128.0 | 1177.0 | 1208.0 | 1169.0 | 1307.0 | 1193.0 |
| Week 9 | 37.8 | 577.0 | 1358 | 1374.0 | 1366.0 | 1432.0 | 1392.0 | 1457.0 | 1404.0 |
| Week 12 | 40.7 | 651.0 | 1235 | 1319.0 | 1489.0 | 1437.0 | 1524.0 | 1573.0 | 1416.0 |

As can be seen from the values presented in TABLE 1, there was a significant and surprising synergistic effect when humic additive was combined with elemental sulphur. This effect is seen with addition of a small amount of humic additive (relative to the elemental sulphur) in the fertilizer granule, and results in enhanced sulphate release. For example, the amount of sulphate released from T-90 was increased by greater than 2-fold when the fertilizer contained either 0.5% or 0.25% humic additive (compare T-90 with T-90·0.5H, T-90·0.5R&H, and T-90·0.25R&H). This enhancement is also seen with the 85% sulphur fertilizer (see T-85·0.5H, T-85·0.25R&H). The enhancement can be seen throughout the duration of the study (at week 1, T-90·0.5H÷T-90=2.67; at week 12, T-90·0.5H÷T-90=2.03).

Thus, as can be seen in TABLE 1, a small amount of humic additive in the fertilizer composition had a significant effect on the amount of sulphate released over the twelve week period. The oxidation of sulphur into sulphate is typically accomplished through microorganisms in the soil, and it is therefore believed that the humic acid that is released by the humic additive may enhance the ability of the micro-organisms to break down the elemental sulphur.

Test 2

A second laboratory trial (see TABLE 2 below) was conducted similarly to TEST 1. The fertilizer compositions have the same composition as the fertilizers used in TEST 1.

Figure 4:
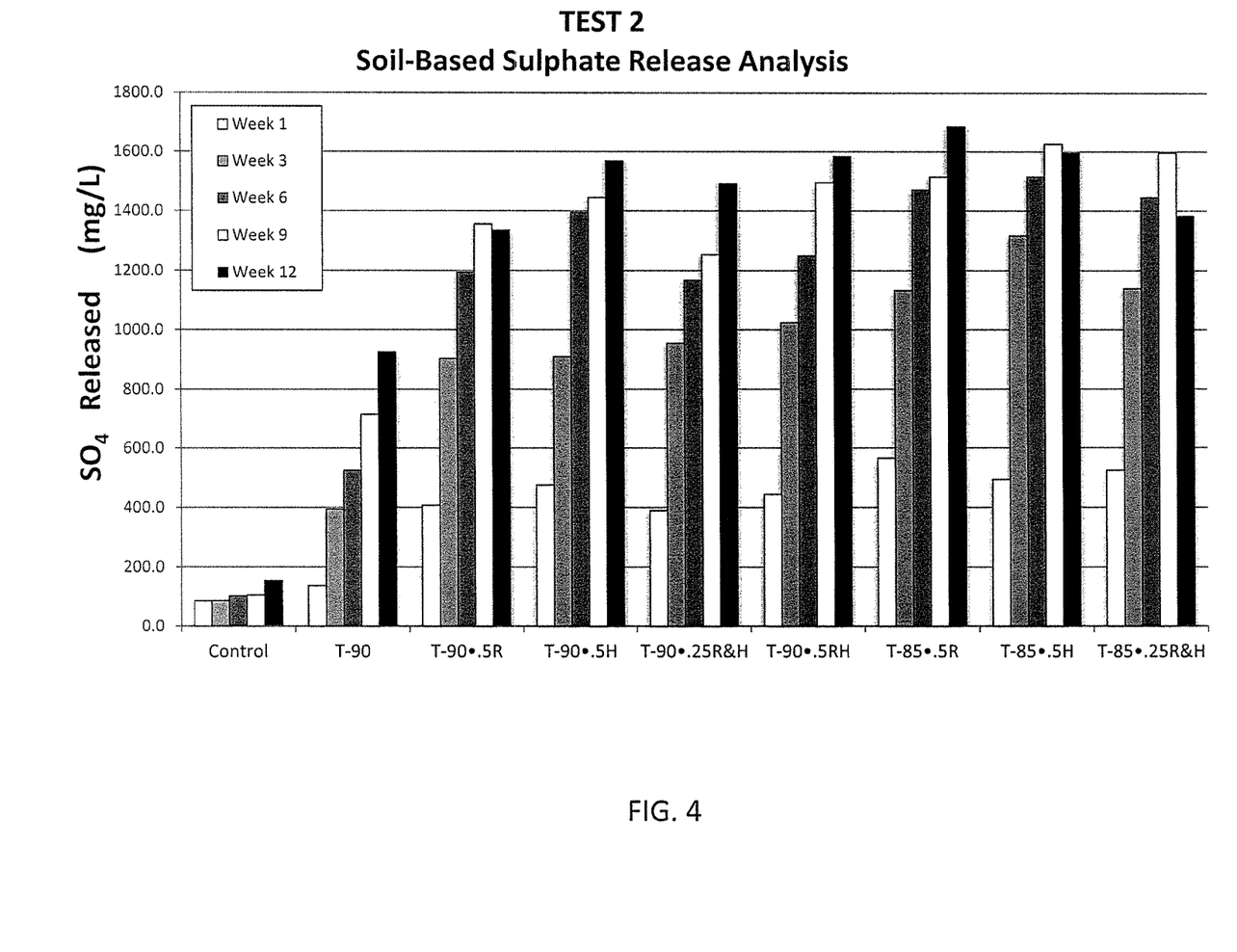
FIG. 4 is a graph of results from tests performed comparing various embodiments of the disclosed fertilizer composition.

Table 2 illustrates the results of the second laboratory trial in which the various fertilizer compositions were compared. This second trial was also performed under the same controlled laboratory conditions as in TEST 1. In this study, the amount of sulphate released was also measured over a twelve week period. Results from this study are presented at TABLE 2 and shown, graphically, at FIG. 4.

TABLE 2

|  | Control | T-90 | T-90•.5R | T-90•.5H | T-90•.25R&H | T-90•.5R&H | T-85•.5R | T-85•.5H | T-85•.25R&H |
|---|---|---|---|---|---|---|---|---|---|
| Week 1 | 85.9 | 138 | 408 | 476 | 389 | 445 | 565 | 493 | 523 |
| Week 3 | 86.3 | 395 | 904 | 909 | 954 | 1025 | 1132 | 1316 | 1139 |
| Week 6 | 102 | 525 | 1194 | 1394 | 1167 | 1249 | 1470 | 1516 | 1444 |
| Week 9 | 106 | 713 | 1356 | 1444 | 1253 | 1496 | 1516 | 1626 | 1596 |
| Week 12 | 155 | 926 | 1335 | 1568 | 1493 | 1583 | 1685 | 1595 | 1382 |

Test 3

A third laboratory trial (see TABLE 3 below) was conducted similarly to TESTS 1 and 2. The fertilizer compositions used in this test have similar compositions to the fertilizers used in TESTS 1 and 2. However the humic additive used in TEST 3 was obtained from Leonardite Products (SOURCE FINES; Williston, N. Dak.). In addition, in TEST 3, only 0.5% humic additive and 0.5% rock phosphate additives were tested, but not in combination as was done in TESTS 1 and 2.

Figure 5:
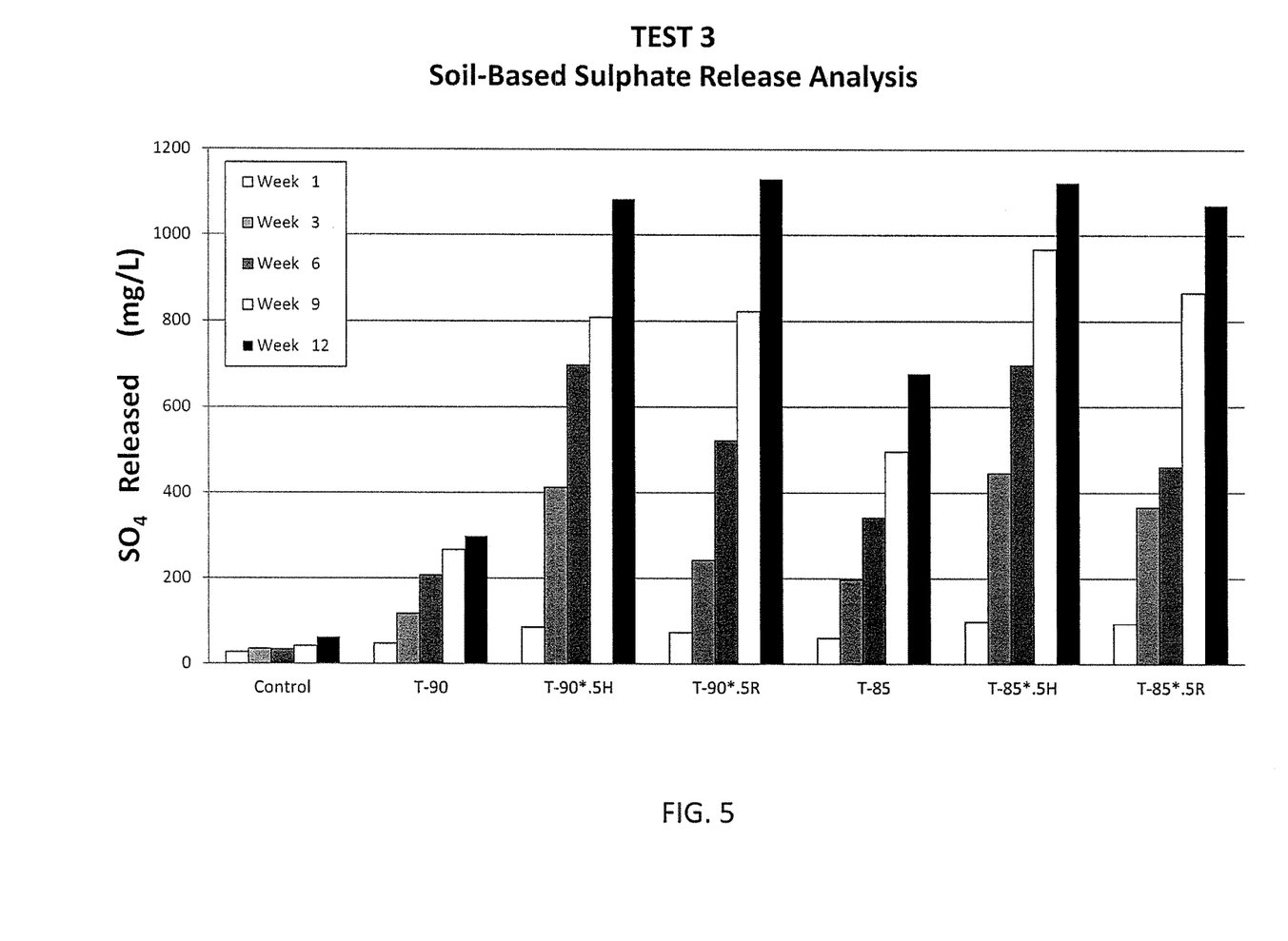
FIG. 5 is a graph of results from tests performed comparing various embodiments of the disclosed fertilizer composition.

TABLE 3 presents the results of the third laboratory trial in which the various fertilizers were compared. This trial was also performed with native soil under the same controlled laboratory conditions as in TESTS 1 and 2, and sulphate release measured over a twelve week period. The results presented in TABLE 3 are shown, graphically, in FIG. 5.

TABLE 3

|  | Week 1 | Week 3 | Week 6 | Week 9 | Week 12 |
|---|---|---|---|---|---|
| Control | 27.3 | 35.2 | 33.7 | 42 | 62 |
| T-90 | 48 | 118 | 207 | 267 | 299 |
| T-90•.5H | 85 | 412 | 697 | 808 | 1083 |
| T-90•.5R | 73.4 | 242 | 521 | 822 | 1131 |
| T-85 | 60.3 | 197 | 342 | 495 | 677 |
| T-85•.5H | 99.2 | 445 | 696 | 967 | 1123 |
| T-85•.5R | 93.5 | 366 | 459 | 865 | 1070 |

Here again, the controlled release fertilizers containing humic additives show surprisingly enhanced sulphate release. As in TESTS 1 and 2, the effect on sulphate release is about two-fold (at week 3, T-85·0.5H÷T-85=2.26; at week 12, T-85·0.5H÷T-85=1.66; and for T-90 the same weeks showed sulphate release increases of 3.49 and 3.66).

Application of the disclosed fertilizer composition may also be used to condition the soil, for example acidifying an alkaline soil.

While the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

We claim:

1. A fertilizer composition comprising:
   at least 70% by weight of elemental sulphur;
   5% to 25% by weight of swelling material; and
   0.01% to 5% by weight of humic additive.

2. The fertilizer composition of claim 1, wherein the percentage of elemental sulphur is at least 75% by weight of total weight of the fertilizer composition.

3. The fertilizer composition of claim 2, wherein the percentage of elemental sulphur is 85% by total weight of the fertilizer composition.

4. The fertilizer composition of claim 1, wherein the humic additive is present in an amount of 0.1% to 1.0% by weight.

5. The fertilizer composition of claim 4, wherein the humic additive is present in an amount of about 0.5% by weight.

6. The fertilizer composition of claim 1, wherein the fertilizer composition is a controlled release fertilizer composition.

7. The fertilizer composition of claim 6, wherein the fertilizer composition comprises from 5% to 15% by weight of the swelling material.

8. The fertilizer composition of claim 1, wherein the swelling material is a swelling clay.

9. The fertilizer composition of claim 8, wherein the swelling clay is bentonite clay.

10. The fertilizer composition of claim 1, further comprising one or more additional nutrients selected from the group consisting of nitrogen, potassium, iron, copper, zinc, boron, manganese, and magnesium.

11. The fertilizer composition of claim 10, wherein the one or more additional nutrients is present in the fertilizer composition in an amount of from about 0.01% to 20% by weight.

12. The fertilizer composition of claim 1, wherein the fertilizer composition is provided as one or more of a pellet, pastille, or granule.

13. The fertilizer composition of claim 1, wherein the humic additive contains at least 40% by weight of humic acid.

14. The fertilizer composition of claim 1, wherein the humic additive contains at least 50% by weight of humic acid.

15. A method of fertilizing soil, comprising:
   applying the fertilizer composition of claim 1 to a soil.

16. The method of claim 15, wherein the soil includes a plant or plant seed.

17. The method of claim 16, wherein a plant or plant seed is added to the fertilized soil.

18. The fertilizer composition of claim 1, further comprising 0.2% to 0.5% by weight of carbon.

19. The fertilizer composition of claim 1, wherein the fertilizer is formed by:
   mixing molten elemental sulphur, the swelling material, and humic additive, wherein the swelling material comprises from 5% to 25% by weight of the mixture and the humic additive comprises from 0.1% to 5% by weight of the mixture; and
   cooling the mixture to obtain the fertilizer composition.

20. A sulphur-containing fertilizer composition comprising:
   elemental sulphur at about 85% by weight of the total weight of the composition;
   humic additive at about 0.5% by weight, wherein the humic additive has an average size of less than 200 Mesh, and is at least 50% humic acid; and swelling clay at about 14.2% by weight of the total weight of the composition.

21. The sulphur-containing fertilizer composition of claim 20, further comprising carbon at about 0.2% to 0.5% by weight of the total weight of the composition.

22. The sulphur-containing fertilizer composition of claim 20, wherein the sulphur-containing fertilizer composition is formed by:
   mixing molten elemental sulphur, the swelling clay, and humic additive, wherein the swelling clay comprises about 14.2% by weight of the mixture and the humic additive comprises 0.5% by weight of the mixture; and
   cooling the mixture to obtain the sulphur-containing fertilizer composition.

* * * * *